United States Patent
Adkins et al.

(10) Patent No.: US 6,548,564 B1
(45) Date of Patent: Apr. 15, 2003

(54) POLYETHER POLYOLS WITH INCREASED FUNCTIONALITY

(75) Inventors: Rick L. Adkins, New Martinsville, WV (US); Harold R. Parsons, Wheeling, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/016,846

(22) Filed: Dec. 13, 2001

(51) Int. Cl.[7] .......................... C08G 18/08; C07C 43/00
(52) U.S. Cl. ............ 521/164; 252/182.26; 252/182.27; 252/182.34; 521/166; 521/174; 568/583; 568/606; 568/704; 568/712
(58) Field of Search ................................ 521/164, 166, 521/174; 568/583, 606, 704, 712; 252/182.26, 182.27, 182.34

(56) References Cited

U.S. PATENT DOCUMENTS

| | | | |
|---|---|---|---|
| 3,085,085 A | | 4/1963 | Wismer et al. |
| 3,153,002 A | | 10/1964 | Wismer et al. |
| 3,941,769 A | | 3/1976 | Maassen et al. |
| 3,981,829 A | * | 9/1976 | Cenker et al. ............... 521/107 |
| 4,230,824 A | | 10/1980 | Nodelman .................. 521/167 |
| 4,380,502 A | | 4/1983 | Müller et al. |
| 4,446,313 A | | 5/1984 | Dix et al. |
| 4,820,810 A | | 4/1989 | Klein et al. |
| 4,996,310 A | | 2/1991 | Axosta |
| 5,106,883 A | * | 4/1992 | Horacek ..................... 521/105 |
| 5,596,059 A | | 1/1997 | Hager et al. |
| 5,625,045 A | | 4/1997 | Gupta et al. |

FOREIGN PATENT DOCUMENTS

| | | |
|---|---|---|
| CA | 2143972 | 9/1995 |
| EP | 0 491 233 | 6/1992 |

OTHER PUBLICATIONS

J. Org. Chem., 13, (1948) pp. 782–785, J. W. Lemaistre and Raymond B. Seymour, The Reaction of Sucrose With Ethylene Oxide.

* cited by examiner

*Primary Examiner*—John M. Cooney, Jr.
(74) *Attorney, Agent, or Firm*—Joseph C. Gil; N. Denise Brown

(57) ABSTRACT

This invention relates to a process for the preparation of a polyether polyol having a functionality of at least about 3, a molecular weight of from about 560 to about 35,000 and an OH number of from about 10 to about 1,100. This process comprises reacting (a) a polyether polyol containing one or more ether groups, having a functionality of about 2 to about 8, a molecular weight of about 106 to about 12,000, and an OH number of about 28 to about 1,400, with (b) cyanuric chloride, optionally, in the presence of (c) one or more catalysts; wherein the functionality of the resultant polyether polyols equals three times the functionality of (a) said polyether polyol, minus three. This invention also relates to the process of reacting a polyether polyol, formed by the stated reaction with cyanuric chloride, with an alkylene oxide, optionally in the presence of a catalyst, to form a polyether polyol that has a higher molecular weight and a functionality greater than or equal to the functionality of the polyether polyol used as the starter in this process.

12 Claims, No Drawings

POLYETHER POLYOLS WITH INCREASED FUNCTIONALITY

FIELD OF THE INVENTION

This invention relates to a process for the preparation of a polyether polyol having a functionality of at least about 3, a molecular weight of from about 560 to about 35,000 and an OH number of from about 10 to about 1,100. This process comprises reacting (a) a polyether polyol containing one or more ether groups, having a functionality of about 2 to about 8, a molecular weight of about 106 to about 12,000, and an OH number of about 28 to about 1,400, with (b) cyanuric chloride, optionally, in the presence of (c) one or more catalysts; wherein the functionality of the resultant polyether polyols equals three times the functionality of (a) the polyether polyol, minus three. This invention also relates to the process of reacting a polyether polyol, formed by the stated reaction with cyanuric chloride, with an alkylene oxide, optionally in the presence of a catalyst, to form a polyether polyol that has a higher molecular weight and a functionality greater than or equal to the functionality of the polyether polyol used as the starter in this process.

BACKGROUND OF THE INVENTION

High functionality polyether polyols with acceptable viscosities are used as the isocyanate-reactive component in the production of rigid polyurethane foams. Polyether polyols are conventionally prepared by the alkoxylation of a suitable starter, which contains one or more OH or NH groups in the presence of a suitable catalyst. Commonly used rigid foam polyols have OH numbers from 350 to 650, viscosities at 25° C. range from 300 mPa·s to 35,000 mPa·s. Suitable starter materials used to produce polyether polyols include glycols, glycerin, trimethylolpropane, sorbitol, sucrose, and aliphatic and aromatic amines. Propylene oxide is the most commonly used alkylene oxide. Further, in order to produce rigid polyurethane foams it is necessary to employ a polyether polyol with a functionality greater than 3. Therefore, the alcohols employed to produce polyol must have a high functionality in order to admix and react with the alkylene oxides and obtain a functionality greater than 3.

It is known to prepare sucrose polyether polyols by reacting sucrose with alkylene oxide in an aqueous solution in the presence of sodium hydroxide. See, for example, LeMaistre, et al., J. Org. Chem., 13, p. 782, (1948). U.S. Pat. Nos. 3,085,085 and 3,153,002 disclose a process based on this reaction in which sucrose is reacted at elevated temperatures with ethylene oxide or propylene oxide in a concentrated aqueous solution in the presence of potassium hydroxide catalyst.

Most processes for sucrose based polyether polyols described in the literature involve the reaction of the sucrose with alkylene oxide in volume. This reaction has the advantage that products of high functionality (i.e. 7 to 8) are obtained and that the reaction time is short. In this way the sucrose is suspended in the alkylene oxide. However, in this way polyether polyols with high viscosity normally between 40,000 and 400,000 centipoises at ambient temperature, are obtained. This is not practical since problems are caused in the handling of the high viscosity polyether polyol in normal foaming machines. Also, there is a risk represented by handling large quantities of alkylene oxide within the reactors at the reaction temperature due to the high vapor pressure, which makes this highly explosive.

U.S. Pat. No. 3,941,769 discloses a process in which sucrose is reacted with epoxide in an organic; dispersing agent such as benzene, toluene, ethylbenzene, xylene or chlorobenzene (boiling range 80°–180° C.). This process has some serious disadvantages, however. First, the dispersing agents lower the reaction capacity by 10–40%. Second, the dispersing agent must be removed at the end of the production process. The products obtained by this process have high functionalities and high viscosities (104,000–400,000 mPa·s) due to the degree of alkoxylation. These also exhibit an intense brown color.

U.S. Pat. No. 4,380,502 discloses the use of polyether polyols made by alkoxylating a mixture which is from 20 to 80 wt. % sucrose and 80 to 20 wt. % formitol. This reference discloses that the polyether polyols prepared therein exhibit a color ranging from clear to yellowish.

U.S. Pat. No. 4,230,824 discloses a method for preparing a sucrose based polyether polyol which involves the use of a polyalkylene polyamine as both co-initiator and catalyst for the alkoxylation reaction of sucrose. This reference reports that the resulting polyether polyols are very high in color content.

U.S. Pat. No. 4,996,310 discloses a polyol-polyether having a molecular weight between 400 and 900, a viscosity between 500 and 3,500 centipoises at 25° C., and a content of ethylene oxide between 40% and 75% by weight. The polyether polyol is prepared by a process which comprises the steps of: (a) forming a suspension of sucrose in a triol; (b) reacting the mixture obtained in the prior step with propylene oxide in the presence of a catalyst; (c) suspending sucrose in the mixture obtained in the prior step; (d) oxyethylizing the mixture of step (c); and (e) eliminating the volatile components of the mixture and the catalyst.

U.S. Pat. No. 5,625,045 discloses a method for preparing high functionality, low viscosity, light colored sucrose-based polyethers polyols by reacting a starter mixture containing i) sucrose, ii) a low molecular weight, relatively high valency alcohol and/or an alkoxylation product of such an alcohol and iii) an alkali metal hydroxide, with an alkylene oxide at a temperature of from about 90° to about 130° C. and at a pressure of from about 0.3 to about 4 bar excess nitrogen pressure. These sucrose based polyether polyols are suitable for use in rigid polyurethane foam applications.

U.S. Pat. No. 4,332,936 describes a method for making polyether polyols from solid initiator compounds containing from 4 to 8 hydroxyl groups. The method involves dissolving the solid initiator compound in a solvent such as dimethyl formamide prior to alkoxylation.

The method is particularly useful in making high functionality sucrose-based polyether polyols that can be readily processed at moderate temperatures and give low color products. These polyether polyols are particularly suited for the production of rigid polyurethane foams.

U.S. Pat. No. 4,820,810 discloses that urea is an effective catalyst and co-initiator for the alkoxylation of aqueous sucrose solutions and results in polyether polyol products with low color content.

U.S. Pat. No. 4,446,313 describes a process for the manufacture of a polyether polyol by reaction between an organic compound containing 2 or more active hydrogen atoms in the molecule and an alkylene oxide in the presence of a catalyst comprising a tertiary amine. Suitable tertiary amine catalysts have the formula NRR'$_2$ in which R is a cycloalkyl or cycloalkenyl group and each R' may be an alkyl, cycloalkyl or cycloalkenyl group.

U.S. Pat. No. 5,596,059 discloses polyoxyalkylene polyether polyols suitable for preparation of flexible polyurethane foams. These are prepared by oxyalkylating an aqueous solution of one or more polyhydric, hydroxyl-functional solid initiators under conditions where both water as well as initiator are oxyalkylated. The polyether polyols have calculated functionalities of between about 2.2 and 4.0 and hydroxyl numbers in the range of 10 to 180. The polyether polyols may be used to prepare soft, high resiliency polyurethane flexible foams at low isocyanate indexes.

EP 491233A1 discloses low viscosity, highly functional polyetherols obtained by reaction of a compound containing 2 to 8 active hydrogens in the form of hydroxyl groups, thiol groups, primary amino groups and/or secondary amino groups with one or more epoxides in the presence of a base to form an intermediate. This intermediate is further reacted with a q-valent compound that contains at least one epoxy group and at least one chlorine or bromine atom to form the polyetherols. The chlorine containing compounds referred to are epichlorohydrin types molecules.

EP 671424B1 discloses a process for the production of a highly functional, modified polyether polyol by reacting n moles of a starting polyether polyol having a functionality of x with m moles of a compound having a functionality of y which compound has groups that are reactive with hydroxyl groups. The product of nx is described as greater than the product of my. If more than one starting polyether polyol is used, the value of x for each polyether polyol may be the same or it may be different. The polyether polyol produced by this reaction is a high functionality, modified polyether polyol having a total functionality of (nx–my)/m.

Applicants' copending U.S. application Ser. No. 10/017, 045, filed the same day as the present application and which is commonly assigned, describes a process for the preparation an isocyanate-reactive compound having a functionality of 3 to 15. The process comprises reacting (a) an organic compound which is free of ether groups, and containing from about 2 to about 8 reactive groups; with (b) cyanuric chloride; optionally, in the presence of, (c) one or more catalysts. The functionality of the resultant isocyanate-reactive compound equals three times the functionality of (a) the organic compound, minus three. This copending application also describes the further reacting of the isocyanate-reactive compound with an alkylene oxide, optionally in the presence of a catalyst, to form a polyether polyol.

An advantage of the present invention is that it provides a versatile process for producing polyols of any desired functionality under relatively mild conditions. High temperatures and pressures are not required (i.e. temperatures in excess of about 100° C. and pressures greater than atmospheric).

As discussed above, at the present time there is not an available method for the production of high functionality polyether polyols based on cyanuric chloride.

OBJECT OF THE INVENTION

An object of the present invention is to form high functionality polyether polyols from known, commercially available polyether polyols. A further object is to provide polyether polyols with a functionality of at least 3 to be used in polyurethane rigid foam applications. Still another object is to react these polyether polyols, with an alkylene oxide, optionally in the presence of a catalyst, to form higher molecular weight polyether polyols to be used in polyurethane rigid foam applications. In addition to meeting the stated functionality objects, the process according to the present invention produces polyether polyols that exhibit increased reactivity toward isocyanates.

SUMMARY OF THE INVENTION

This invention relates to a process for the preparation of a polyether polyol having a functionality of at least about 3, a molecular weight of from about 560 to about 35,000 and an OH number of from about 10 to about 1,100. This process comprises reacting (a) a polyether polyol containing one or more ether groups, having a functionality of about 2 to about 8, a molecular weight of about 106 to about 12,000, and an OH number of about 28 to about 1,400, with (b) cyanuric chloride, optionally, in the presence of (c) one or more catalysts; wherein the functionality of the resultant polyether polyols equals three times the functionality of (a) said polyether polyol, minus three. This invention also relates to the process of reacting a polyether polyol, formed by the stated reaction with cyanuric chloride, with an alkylene oxide, optionally in the presence of a catalyst, to form a polyether polyol that has a higher molecular weight and a functionality greater than or equal to the functionality of the polyether polyol used as the starter in this process.

DETAILED DESCRIPTION OF THE INVENTION

The polyether polyols produced according to the present invention have a functionality of at least about 3, preferably about 6, a molecular weight of from about 560 to about 35,000, preferably from about 800 to about 10,000, and an OH number of from about 10 to about 1,100, preferably from about 20 to 600. The polyether polyols comprise the reaction product of (a) a polyether polyol, with (b) cyanuric chloride, optionally, in the presence of (c) one or more catalysts. The functionality of the resultant polyether polyols equals three times the functionality of (a) the polyether polyol minus three. The functionality of the resultant polyether polyol, f(p), can be represented by the following formula:

$$f(p)=(3 \times f(a))-3,$$

wherein:

f(a): represents the functionality of the polyether polyol, which is used as component (a).

Component (a) the polyether polyol contains one or more ether groups, has a functionality of about 2 to about 8, preferably about 3 to 6, most preferably about 6, a molecular weight of about 106 to about 12,000, preferably about 400 to 6,000, most preferably about 3,350, and an OH number of about 28 to about 1,400, preferably about 50 to 700, most preferably about 100. Any presently known polyether polyol that meets the ether group, functionality, molecular weight, and OH number requirements as stated can be used as component (a).

Ether-containing polyether polyols to be used as component (a) in the process of the present invention include the alkoxylation products of starter compounds having molecular weights of up to 400 and having from 2 to 8 hydroxyl groups, 2 to 8 thiol groups and/or 1 to 4 amino groups. Specific examples of starter compounds from which suitable starter polyether polyols may be made include: ethylene glycol, diethylene glycol, 1,2-propylene glycol, 1,4-butanediol, hexamethylene glycol, bisphenol A, trimethylolpropane, glycerol, pentaerythritol, sorbitol, sugar (sucrose), degraded starch, water, methylamine, ethylamine, propylamine, butylamine, aniline, benzylamine, o- and p-toluidine, α- and β-naphthyl-amine, ammonia, ethylenediamine, propylenediamine, 1,4-butylenediamine, 1,2-, 1,3-, 1,4-, 1,5- and 1,6-hexamethylenediamine, o-, m- and p-phenylenediamine, 2,4-, 2,6-tolylenediamine, 2,2'-, 2,4'- and 4,4'-diamino-diphenylmethane and diethylenediamine, etc., and mixtures of these compounds. Also suitable are alkoxylation products of thiol alcohols or thiol amines such as, for example, 1-thioglycerol, thiosorbitol, 2-mercaptoethanol, 2-aminoethanethiol, 2-aminothiazole, etc.

The alkylene oxide reactant is suitably of the class conventionally employed in the production of polyol polyethers. Preferred alkylene oxides are ethylene oxide, propylene oxide, butylene oxide, THF styrene oxide and mixtures thereof. If desired, it is also possible that one alkylene oxide may be initially utilized in a first stage of the etherification reaction and another alkylene oxide in a later stage.

Component (a) is present in the reaction with (b) cyanuric chloride in amounts such that there are from 1 to 5 moles of component (a), for each 1 mole of component (b), the cyanuric chloride. Preferably, component (a) is present in an amount such that there are from 2 to 3 moles of the organic compound (a) for each 1 mole of component (b), the cyanuric chloride.

When optional component (c), the catalyst(s) is present in the reaction, it is present in an amount such that there are 0.1 to 1.0 equivalent of the catalyst(s), per 1 equivalent of cyanuric chloride. Suitable catalysts are well known in the art of polyether polyol production such as catalysts suitable in the alkoxylation process. Examples of suitable catalysts include alkali hydroxides, e.g., potassium hydroxide and sodium hydroxide, an amine catalyst, preferably a secondary or tertiary amine, DMC (double metal cyanide) catalysts and mixtures thereof.

The reaction of (a) a polyether polyol containing one or more ether groups, having a functionality of about 2 to about 8, a molecular weight of about 106 to about 12,000, and an OH number of about 28 to about 1,400, with (b) cyanuric chloride, optionally, in the presence of (c) one or more catalysts to form the high functionality polyether polyol can be represented by the following formula I.

formula I

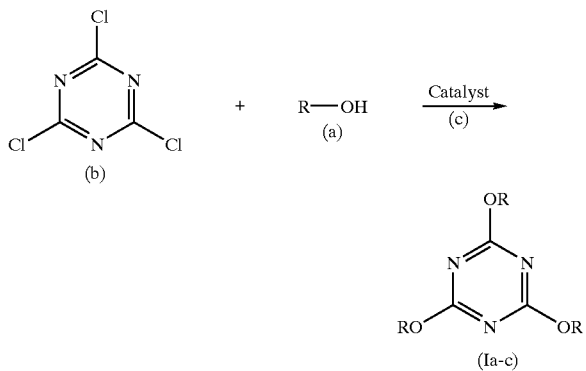

wherein:
each R: individually represents an ether alcohol containing 1 or more ether groups, having a functionality of about 1 to 7, and a molecular weight of about 90 to about 12,000, wherein the ether alcohols may optionally contain sulfur and/or nitrogen atoms, and may optionally contain aromatic groups.

The process according to the invention can be described as follows. The polyether polyol (a) and the optional catalyst (c) are added to a reactor under nitrogen. The cyanuric chloride (b) is added such that the exothermic reaction is maintained at 40° C. or less, with an ice bath or other suitable cooling means. After all the cyanuric chloride (b) is added, the solution is then heated for about 1 to about 2 hours, at about 80 to about 90° C.

Optionally, a solvent, which is inert towards phosgene and is water-miscible, such as, for example, acetone or acetonitrile may be present in the reaction. If such a solvent is present, it is preferably added to the starting polyether polyol (a) and optional catalyst (c) before the cyanuric chloride is added. The solvent is present in amounts of 0.2 to 5 ml per gram of polyether polyol.

Another aspect of the presently claimed invention comprises the polyether polyols produced by the above described process. These polyether polyols are characterized as having a functionality of at least about 3, preferably about 6, a molecular weight of from about 560 to about 35,000, preferably from about 800 to about 10,000, and an OH number of from about 10 to about 1,100, preferably from about 20 to about 600, and correspond to the general formula:

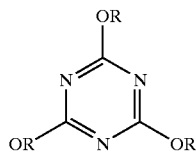

(Ia-c)

wherein:
each R: individually represents an ether alcohol containing 1 or more ether groups, having a functionality of about 1 to 7, and a molecular weight of about 90 to about 12,000, wherein the ether alcohols may optionally contain sulfur and/or nitrogen atoms, and may optionally contain aromatic groups.

Another aspect of the present invention comprises (1) reacting (d) the previously formed polyether polyols having a functionality of at least about 3, a molecular weight of from about 560 to about 35,000 and an OH number of from about 10 to about 1,100; with (e) an alkylene oxide; optionally in the presence of (f) one or more catalysts; thereby forming a second polyether polyol (which is different than the polyether polyol used as a reactant (d) above) and wherein the functionality of the second polyether polyol is greater than or equal to the functionality of the polyether polyol used as a reactant.

Polyether polyols in accordance with the present invention can be prepared by any of the known processes such as are described in, for example, U.S. Pat. Nos. 4,209,609 and 4,421,871, the disclosures of which are herein incorporated by reference, and as described in British Patent 1,298,185. In general, the polyether polyols of the present invention are prepared by reacting an alkylene oxide with the hydroxyl-group containing compound, optionally in the presence of an alkaline catalyst.

Some examples of alkylene oxides useful in producing polyether polyols of the present invention include: ethylene oxide, propylene oxide, butylene oxide, and mixture of these alkylene oxides. Combinations of ethylene oxide and propylene oxide are particularly preferred. In principle, any alkaline material capable of catalyzing the epoxidation reaction of the present invention may be used. Specific alkalline catalysts which have been found to be particularly suitable include compounds such as, for example, but are not limited to, potassium hydroxide, and sodium hydroxide. Potassium hydroxide is a preferred catalyst.

In general, the epoxidation reaction occurs by contacting the hydroxyl-group containing compound of the process with the alkylene oxide(s) at an elevated temperature in the range of from 90 to 180° C. under moderately elevated pressure, optionally in the presence of an alkaline catalyst.

If an alkaline catalyst is used in the preparation of the polyether polyol, the resultant mixture which contains the alkaline catalysts in amounts of from about 0.1% to about 1.0% as KOH is neutralized with an acid such as, for example, sulfuric acid, phosphoric acid, lactic acid or oxalic acid. Neutralization may be accomplished by mixing the acid and reaction mixture at ambient conditions with stirring, then distilling to remove any excess water. The neutralized polyether polyol need not have pH of exactly 7.0. The reaction mixture may be maintained at a slight acidity or alkalinity, i.e. at a pH of from 5 to 11, preferably from 6 to 10. If the salt formed is soluble in the polyol, it may be left in. Otherwise, the salt can be removed by, for example, filtration.

The amount of alkylene oxide used in the reaction according to the invention, relative to the quantity of polyol converted, determines the functionality and molecular weight of the polyether product.

This last step of alkoxylation is unnecessary but may be desirable in some situations. The polyether polyol that is formed before this step already has an increased functionality over the starting polyol (a). Thus, the polyether polyol formed initially by reacting a polyether polyol with cyanuric chloride is suitable to use in polyurethane foaming applications, without further alkoxylation.

The polyether polyols, before or after the optional step of alkoxylation, obtained in the process of the invention show a high reactivity with respect to isocyanates, and are particularly suitable for the production of cellular or non-cellular polyurethanes in accordance with the general methods described in the literature, for instance by reacting the polyether polyols, possibly admixed with other active hydrogen atom-containing compounds, with organic polyisocyanates, if desired in the presence of other substances, such as foaming agents, surface-active agents, flame-retarding agents and other additives known in the art.

In addition to exhibiting increased functionality over the starting polyether polyols, the process of the present invention unexpectedly yielded polyether polyols with increased reactivity. Polyether polyols prepared according to the invention exhibit a faster reaction rate than conventional polyether polyols. Since the reactivity of the resulting polyether polyols is higher, less catalyst is necessary in formulations to subsequently form polyurethanes from them.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following Table illustrates the amount of materials used in Example 1 which were reacted according to the invention to form the high functional polyether polyol (i.e. Polyether Polyol 1).

TABLE 1

| Example 1 | Amount |
| --- | --- |
| Polyol A | 100 g |
| Cyanuric Chloride | 1.8 g |

TABLE 1-continued

| Example 1 | Amount |
| --- | --- |
| Catalyst A | 3.6 g |
| Solvent A | 100 mL |

Polyol A: a polyether polyol initiated from sorbitol with propylene oxide and ethylene oxide (in an 18:82 weight ratio), having an OH# of 100, a functionality of 6, and a molecular weight of 3365.
Catalyst A: KOH, used as a solution of 46% by weight KOH in water.
Solvent A: N,N-dimethylformamide.

Polyol A and Catalyst A were added to a reactor vessel and were heated for 30 minutes at 115° C. under full ASP vacuum. Solvent A was then added to the vessel. Fifteen (15) minutes later, the cyanuric chloride was added in small dosages while the vessel was in an ice bath at 30° C. After 30 minutes of adding the cyanuric chloride, the reaction solution was slowly heated for 1 hour to 90° C. After the hour, the resulting solution was filtered. Solvent A was then distilled off at 150° C.

To illustrate the increased reactivity of the resultant polyether polyols of the present invention vs. conventional polyether polyols, tests were conducted to determine the time required (from T=0) for Polyol A vs. Polyether Polyol 1 (produced in Example 1 above) to react with 4,4'-diphenylmethane diisocyanate (having an NCO group content of about 33.6% and a functionality of 2) as shown by a reduction in the NCO group content of the 4,4'-diphenylmethane diisocyanate from about 33.6% to 32.6%. The following procedure was used to determine this time.

Into a flask, was charged 400 grams of 4,4'-MDI having a functionality of 2 and an NCO group content of about 33.6%. In Example 2A, 8.1 grams of Polyol A were charged to the flask, and the contents of the flask heated to 60° C. Time T=0 was defined as the time at which the reaction temperature reached 60° C. T=0 was the starting point for measuring the time necessary to reduce the NCO group content of the isocyanate to 32.6%. Since Example 2A was not visibly exothermic, it was not necessary to control the reaction temperature by an external means such as, for example, an ice bath.

In Example 2B, 8.1 grams of Polyether Polyol 1 were charged slowly over time to a flask containing 400 grams of 4,4'-MDI having a functionality of 2 and an NCO group content of about 33.6%. Since the reaction between the Polyether Polyol 1 and MDI was exothermic, it was controlled with an ice bath such that it did not exceed 60° C. As in Example 2A above, time T=0 was defined as the time at which the reaction temperature reached 60° C. T=0 was the starting point for measuring the time necessary to reduce the NCO group content of the isocyanate to 32.6%.

The time required to reach this same NCO group content of the same isocyanate is illustrated in Table 2 below.

TABLE 2

| Example | Polyether Polyol | Time to reduce NCO content of 4,4'-MDI from 33.6% to 32.6% |
| --- | --- | --- |
| Example 2A | Polyol A | 3.5 hours |
| Example 2B | Polyether Polyol 1 | 1 hour |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a polyether polyol having a functionality of at least about 3, a molecular weight of from about 560 to about 35,000 and an OH number of from about 10 to about 1,100, comprising
   (1) reacting
      (a) a polyether polyol containing one or more ether groups, having a functionality of about 2 to about 8, a molecular weight of about 106 to about 12,000, and an OH number of about 28 to about 1,400, with
      (b) cyanuric chloride optionally, in the presence of
      (c) one or more catalysts;
   wherein the functionality of the resultant polyether polyol equals three times the functionality of (a) said polyether polyol minus three.

2. The process according to claim 1, wherein (a) said polyether polyol has a functionality of about 3 to about 6, a molecular weight of about 400 to about 6,000 and an OH number of about 50 to about 700.

3. The process of claim 2, wherein (a) said polyether polyol has a functionality of about 6, a molecular weight of about 3,350 and an OH number of about 100.

4. The process of claim 1, wherein (a) said polyether polyol additionally contains sulfur atoms, nitrogen atoms, or both.

5. The process of claim 1, wherein (a) said polyether polyol is present in the reaction in an amount such that there are from 1 to 5 moles of (a) said polyether polyol, for each 1 mole of (b) said cyanuric chloride.

6. The process of claim 5, wherein (a) said polyether polyol is present in the reaction in an amount such that there are from 2 to 3 moles of (a) said polyether polyol for each 1 mole of (b) said cyanuric chloride.

7. The process of claim 1, wherein the reaction between (a) said polyether polyol and (b) said cyanuric chloride occurs in the presence of (c) one or more catalysts and (d) a solvent.

8. The polyether polyols produced by the process of claim 1.

9. A polyether polyol having a functionality of at least 3, a molecular weight of from about 560 to about 35,000 and an OH number of about 10 to about 1,100 corresponding to the general formula:

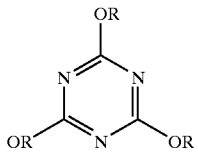

(Ia-c)

wherein:

each R: represent an ether alcohol containing 1 or more ether groups, having a functionality of about 1 to 7, and a molecular weight of about 90 to about 12,000.

10. The polyether polyols of claim 9 having a functionality of about 6, a molecular weight of from about 800 to about 10,000 and an OH number of about 20 to about 600.

11. A process for forming a higher molecular weight polyether polyol comprising (1) reacting
   (d) the polyether polyol prepared in claim 1 having a functionality of at least about 3, a molecular weight of from about 560 to about 35,000 and an OH number of from about 10 to about 1,100; with
   (e) an alkylene oxide; and
   (f) optionally a catalyst;
thereby forming said higher molecular weight polyether polyol wherein the functionality of the resultant polyether polyol is greater than or equal to the functionality of (d) the reactant polyether polyol.

12. A process for the production of a rigid polyurethane foam comprising reacting the polyether polyol of claim 9 with a polyisocyanate component.

* * * * *